US010974670B2

(12) United States Patent
Lindhuber et al.

(10) Patent No.: US 10,974,670 B2
(45) Date of Patent: Apr. 13, 2021

(54) DRIVER ASSISTANCE SYSTEM FOR DRIVER ASSISTANCE FOR CONSUMPTION CONTROLLED DRIVING

(71) Applicant: Bayerische Motoren Werke Aktiengesellschaft, Munich (DE)

(72) Inventors: Stefan Lindhuber, Esting (DE); Christian Popp, Munich (DE); Christof Schulze, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 471 days.

(21) Appl. No.: 15/275,624

(22) Filed: Sep. 26, 2016

(65) Prior Publication Data
US 2017/0008467 A1    Jan. 12, 2017

Related U.S. Application Data

(63) Continuation of application No. 13/240,550, filed on Sep. 22, 2011, now Pat. No. 9,493,071.

(30) Foreign Application Priority Data

Sep. 28, 2010   (DE) .................... 10 2010 041 544.8

(51) Int. Cl.
*B60R 16/023*    (2006.01)
*B60L 15/20*    (2006.01)
(Continued)

(52) U.S. Cl.
CPC .......... *B60R 16/0236* (2013.01); *B60K 35/00* (2013.01); *B60L 1/00* (2013.01);
(Continued)

(58) Field of Classification Search
CPC ............... B60R 16/0236; B60K 35/00; B60K 2370/174; B60K 2370/172; B60L 1/00;
(Continued)

(56) References Cited

U.S. PATENT DOCUMENTS 5,309,139 A    5/1994   Austin
5,578,748 A *  11/1996  Brehob ................... G01F 9/023
                                                            701/123
(Continued)

FOREIGN PATENT DOCUMENTS

CN            1527033 A       9/2004
CN          101002012 A       7/2007
(Continued)

OTHER PUBLICATIONS

Axel Techmer, "Application Development of Camera-Based Driver Assistance Systems on a Programmable Multi-Processor Architecture," 2007, Publisher: IEEE.*
(Continued)

*Primary Examiner* — Tuan C To
(74) *Attorney, Agent, or Firm* — Crowell & Moring LLP (57) ABSTRACT

An apparatus for assisting a driver to achieve optimized driving of a vehicle includes a controller and a display unit. The display unit is configured to display at least one visually highlighted range in place of a conventional fuel consumption display.

12 Claims, 6 Drawing Sheets

(51) Int. Cl.
*B60L 1/00* (2006.01)
*B60K 35/00* (2006.01)
*B60W 50/14* (2020.01)
*B60W 40/12* (2012.01)
*G01C 21/34* (2006.01)

(52) U.S. Cl.
CPC ......... *B60L 15/2045* (2013.01); *B60W 50/14* (2013.01); *B60K 2370/172* (2019.05); *B60K 2370/174* (2019.05); *B60W 40/12* (2013.01); *B60W 2050/146* (2013.01); *B60W 2540/30* (2013.01); *G01C 21/3469* (2013.01); *Y02T 10/64* (2013.01); *Y02T 10/72* (2013.01); *Y02T 10/84* (2013.01)

(58) Field of Classification Search
CPC ... B60L 15/2045; B60W 50/14; B60W 40/12; B60W 2050/146; B60W 2540/30; G01C 21/3469; Y02T 10/64; Y02T 10/72; Y02T 10/84
USPC .......................................................... 701/123
See application file for complete search history.

(56) References Cited

U.S. PATENT DOCUMENTS

| | | | |
|---|---|---|---|
| 5,652,378 A | | 7/1997 | Dussault |
| 5,781,872 A | | 7/1998 | Konishi et al. |
| 6,092,021 A | * | 7/2000 | Ehlbeck ................ G01L 3/26 701/123 |
| 6,480,106 B1 | | 11/2002 | Crombez et al. |
| 6,553,301 B1 | * | 4/2003 | Chhaya ................ B60W 10/18 701/54 |
| 8,058,982 B2 | | 11/2011 | Crowe et al. |
| 8,224,561 B2 | * | 7/2012 | Kim ..................... G07C 5/0825 701/123 |
| 8,315,788 B2 | | 11/2012 | Surnilla et al. |
| 8,793,064 B2 | | 7/2014 | Green et al. |
| 2006/0089781 A1 | * | 4/2006 | Sato ........................ G01F 9/008 701/103 |
| 2007/0181354 A1 | * | 8/2007 | Andri ....................... B60K 6/48 180/65.29 |
| 2007/0247291 A1 | * | 10/2007 | Masuda ................ F02D 11/105 340/439 |
| 2007/0256481 A1 | | 11/2007 | Nishiyama et al. |
| 2008/0163811 A1 | | 7/2008 | Nakamichi |
| 2009/0030582 A1 | | 1/2009 | Jacobi et al. |
| 2009/0063045 A1 | | 3/2009 | Figueroa |
| 2010/0052888 A1 | | 3/2010 | Crowe et al. |
| 2010/0057280 A1 | | 3/2010 | Crowe et al. |
| 2010/0057281 A1 | | 3/2010 | Lawyer et al. |
| 2010/0100306 A1 | | 4/2010 | Gamache |
| 2010/0102945 A1 | | 4/2010 | Watson et al. |
| 2010/0207755 A1 | | 8/2010 | Watson et al. |
| 2010/0219945 A1 | | 9/2010 | Schumann et al. |
| 2010/0250059 A1 | | 9/2010 | Sekiyama et al. |
| 2011/0015856 A1 | | 1/2011 | Arnold |
| 2011/0093187 A1 | | 4/2011 | Skaff et al. |
| 2011/0125367 A1 | | 5/2011 | Sakaguchi et al. |
| 2011/0205044 A1 | | 8/2011 | Enomoto et al. |
| 2011/0224894 A1 | | 9/2011 | Henderson et al. |
| 2012/0041670 A1 | | 2/2012 | Hada |
| 2012/0078467 A1 | | 3/2012 | Schweikl et al. |
| 2012/0078468 A1 | | 3/2012 | Popp et al. |
| 2012/0078496 A1 | | 3/2012 | Lindhuber et al. |
| 2012/0191334 A1 | | 7/2012 | Kashio et al. |
| 2012/0197517 A1 | | 8/2012 | Sengoku et al. |
| 2012/0209465 A1 | | 8/2012 | Dehmann |

FOREIGN PATENT DOCUMENTS

| | | | |
|---|---|---|---|
| CN | 101528497 A | 9/2009 | |
| CN | 101244700 B | 8/2010 | |
| DE | 100 65 602 A1 | 7/2002 | |
| DE | 10 2005 045 049 A1 | 3/2007 | |
| DE | 10 2005 045 265 A1 | 3/2007 | |
| DE | 10 2007 006 501 A1 | 8/2008 | |
| DE | 10 2007 035 426 A1 | 1/2009 | |
| DE | 10 2008 028 561 A1 | 9/2009 | |
| DE | 10 2009 031 085 A1 | 4/2010 | |
| DE | 10 2009 011 015 A1 | 9/2010 | |
| DE | 10 2009 039 092 A1 | 3/2011 | |
| DE | 10 2010 041 537 A1 | 3/2012 | |
| DE | 10 2010 041 539 A1 | 3/2012 | |
| DE | 10 2010 041 544 A1 | 3/2012 | |
| EP | 1 285 842 A2 | 2/2003 | |
| EP | 1 538 018 A2 | 6/2005 | |
| JP | 06146987 A | 5/1994 | |
| JP | 2003 220851 A | 8/2003 | |
| JP | 2008-253181 A | 10/2008 | |
| JP | 2009198223 A * | 9/2009 | |
| JP | 2010 206976 A | 9/2010 | |
| KR | 20100088055 A * | 8/2010 | ............. B60K 35/00 |
| WO | WO 2008/087541 A1 | 7/2008 | |
| WO | WO 2009/125178 A2 | 10/2009 | |
| WO | WO 2010/013133 A1 | 2/2010 | |

OTHER PUBLICATIONS

German Search Report dated Jun. 9, 2011 including partial English-language translation (Twelve (12) pages).
German Search Report dated Feb. 5, 2015, including partial English translation (twelve (12) pages).
German Office Action dated Feb. 6, 2015 (six (6) pages).
Chinese Office Action and English translations dated Feb. 16, 2015 (14 pages).
Lexus, GS450h Hybrid Overview, 2006 (Thirty-one (31) pages).
Munoz-Organero, Mario et al., "Validating the Impact on Reducing Fuel Consumption by Using an EcoDriving Assistant Based on Traffic Sign Detection and Optimal Deceleration Patterns", IEEE Transaction on Intelligent Transportation Systems, Jun. 2013, vol. 14, No. 2, IEEE, pp. 1023-1028.
Du, Jiuyu et al., "Battery Electric Vehicle Parameters Design Targeting to Cost-Benefit Objective", 2012 IEEE Vehicle Power and Propulsion Conference, Oct. 9-12, 2012, Seoul, Korea, IEEE, pp. 1160-1164.
Gupta, G. Sen et al., "Electronic Instrumentation for Real-time Measurement of Fuel Consumption in EFI Gasoline Enginges", IEEE International Instrumentation and Measurement Technology Conference, May 12-15, 2008, Victoria, Canada, IEEE, pp. 6-11.
Syed, Fazal U. et al., "Real Time Advisory System for Fuel Economy Improvement in a Hybrid Electric Vehicle", Fuzzy Information Processing Society, 2008, NAFIPS 2008, pp. 1-6.
Hari, Deepak et al. "Analysis of a Driver Behaviour Improvement Tool to Reduce Fuel Consumption", International Conference on Connected Vehicles and Expo, 2012, IEEE, pp. 208-213.
German Search Report dated Feb. 22, 2011 including partial English-language translation (Nine (9) pages).
van der Voort, M.C., "FEST. A new driver support tool that reduces fuel consumption and emissions," Publication Year: 2001, pp. 90-93.
Hong Tu Luu, Nouveliere, L., Mammar, S., "Ecological and safe driving assistance system : Design and strategy, " Publication Year : 2010, pp. 129-134.

* cited by examiner

DRIVER ASSISTANCE SYSTEM FOR DRIVER ASSISTANCE FOR CONSUMPTION CONTROLLED DRIVING

CROSS-REFERENCE TO RELATED APPLICATIONS

This application is a continuation of U.S. application Ser. No. 13/240,550 filed on Sep. 22, 2011, which is now U.S. Pat. No. 9,493,071 B2, which claims priority under 35 U.S.C. § 119 from German Patent Application No. DE 10 2010 041 544.8, filed Sep. 28, 2010, the entire disclosure of which is herein expressly incorporated by reference.

This application contains subject matter related to U.S. application Ser. No. 13/240,798 entitled "Driver Assistance System for Assisting the Driver for the Purpose of Consumption-Controlled Driving," now U.S. Pat. No. 9,242,653, and application Ser. No. 13/240,827 entitled "Driver Assistance System for Driver Assistance for Consumption Controlled Driving," now U.S. Pat. No. 8,849,507.

BACKGROUND AND SUMMARY OF THE INVENTION

The invention relates to a driver assistance system for driver assistance for consumption controlled driving.

There exist a plurality of driver assistance systems that help the driver, for example, by navigation, by controlling the longitudinal dynamics or by means of warnings while he is driving. Some driver assistance systems also consider to some extent measures for reducing the fuel consumption. For example, DE 10 2007 006 501 describes an automatic cruise control system that intentionally allows larger deviations in order to reduce the fuel consumption. Furthermore, there already exist navigation systems that offer the driver the possibility, when entering a destination, to choose a route from a selection of efficient routes.

It is an object of the invention to improve a driver assistance system of the above-mentioned type with respect to further reducing the fuel consumption while simultaneously taking into account the intentions of the driver.

The invention achieves this and other objects by providing a driver assistance system for assisting the driver in consumption controlled driving. The system includes an electronic control system and feedback functions. The driver assistance system is characterized by a proactive assistant consisting of a control system and a display as the visual feedback function. The control system evaluates the speed and distances as a function of the route data of a predetermined route combined with current vehicle data such that the exact time or the route point, after which a predetermined speed in a defined distance, can be reached in overrun mode and/or in coasting mode. Upon reaching this exact time or this route point, the control system sends by way of the display at least one driving recommendation to release the accelerator pedal of the vehicle.

The invention is based on the following considerations, knowledge and ideas.

When a vehicle driver plans a route with the current generation of navigation systems, the navigation systems provides the driver with the expected trip duration and distance to the destination as the selection criteria for various routes. An improved efficiency oriented navigation system (for example, the future BMW green driving assistant) can offer the automobile driver a tool that also informs him about the fuel consumption on the route and, thus, helps him to select a fuel consumption optimized route.

In the course of planning a route before the start of a trip, the driver can compare the routes that offer the shortest driving time or the lowest fuel consumption. In order to help the driver make a decision, the green driving assistant lists not only the known criteria, arrival time and distance, but also the expected amount of fuel that will be saved. As a result, it is easy to decide whether the potential reduction in fuel consumption is worth a somewhat longer driving time.

In addition, while driving, the green driving assistant offers options to ensure that the driver will reach his destination even more efficiently and comfortably. The assistant alerts the driver as soon as it registers that the remaining range is insufficient to reach the desired destination with the current driving style and route. The system shows whether the fuel consumption could be optimized by activating the ECO mode (for example, by activating an ECO mode button) or by choosing another route, in order to reach the destination nevertheless without having to stop to refuel and, thus, without the associated loss of time.

If the driver wants to continue with the same driving style, the gas station assistant of the green driving assistant allows the timing of a stop at a gas station to be planned into the route. When offering the gas stations, the system takes into consideration whether the driver prefers a particular gas station company because it holds a customer loyalty card or a particular fuel and how great a detour would be involved due to the stop at the gas station. As soon as the driver has decided on a gas station, this station is entered into the navigation system as an intermediate destination, and the route calculation is adapted accordingly.

A driving and/or driver profile, learned by the navigation system, serves as the basis for calculating the range, arrival time and the reduction in fuel consumption for a route. In this context reference is made to BMW's patent application DE 10 2009 039 092, which has not been published yet. For example, an appropriate driver and/or vehicle adaptive algorithm in a control unit can learn the typical fuel consumption preferably by means of a predetermined learning route (of, for example, about 500 km), which the green driving assistant uses to plan each new route.

As stated above, the vehicle may have, in principle, a selector button (ECO mode button), which offers the driver at the touch of this button a number of options to ensure a fuel optimized driving style. A holistic approach comprising the drive configuration and the display concept offers the driver the possibility of reducing his fuel consumption in a number of different ways. The combination of the "proactive driving assistant" and "coasting in neutral" (see below) significantly increases the potential to save fuel.

Therefore, the route data from the navigation system and the measures for an efficient driving style can be combined to save fuel. In accordance with the invention, the drive configuration, the display concept and the proactive driving assistant are the center of interest in the considerations and are explained by and large in more detail below.

Drive Configuration According to the Invention

When the driver activates the ECO mode by way of the selector button or another switch (for example, in the center console of the dashboard), the invention provides that the power output available from the engine remains the same, but its performance characteristics change. The accelerator pedal characteristics and switching characteristics of the automatic transmission and/or the shift point display of manual transmissions are adapted in order to facilitate a more efficient driving mode.

The accelerator pedal characteristic is a key factor in the drive configuration. The vehicle runs in ECO mode up to an accelerator pedal deflection (or rather a gas pedal deflection) of preferably about 70 percent. That is, an increase in deflection results in an increase in the fuel optimized power output by suitably activating, in particular, the actuators of the internal combustion engine. If the driver leaves this range, then the increasing pedal angle results in a transition to the maximum power output. The accelerator pedal characteristic is configured such that this transition is intuitively easy to understand and can be found at any time. Consequently, in normal driving mode, it is possible to obtain a significant advantage in fuel consumption. However, if desired, in certain special situations, such as driving onto a freeway or passing a vehicle, it is possible to request the increased acceleration that is required for such situations.

Display Concept According to the Invention

If the driver switches over into the ECO mode, the displays, preferably modified displays, in the instrument cluster of the dashboard can be activated, thus motivating the driver to drive in a more efficient style. At the same time preferably an accelerator pedal recommendation is displayed, for example, instead of the current fuel consumption. A highlighted area (for example, in blue or green) symbolizes the efficient accelerator pedal range. If the driver leaves this range, then the increasing accelerator pedal angle marks a transition to the maximum power output. In addition, the driver may have the option of defining a customized ECO maximum speed (for example, between 90 km/h and 130 km/h). If the driver exceeds this speed, he receives a reminder in the form of a so-called "ECO tip" on the display. Advantageous improvements for broadening the idea of an ECO tip concept are explained in the exemplary embodiment. The term "ECO tip" is defined as a suggestion to the driver to execute a specific action for the purpose of reducing the fuel consumption.

The ECO mode enables the driver to save fuel and increase the range. This difference in the range is transmitted preferably in a new display in the form of a "bonus range display". In this way the driver is given direct feedback about his success in saving fuel and is rewarded with bonus kilometers. The longer the driver continues to drive economically in ECO mode, the higher the number of bonus kilometers will be.

In addition, the driver can have the display show him a history of his fuel consumption. He can see the mode, in which he has been driving, and how high or low his average fuel consumption is. The "experience technology" monitor, which can be displayed, when desired, gives visual expression to the action that has been taken to ensure an efficient driving style. The active systems are highlighted in an abstracted vehicle diagram, while the text provides more detailed information on the status and effect of each function. In this way the customer can find out which systems are activated and when they are activated, for a better understanding and knowledge of the technology.

For example, it is possible to record a variety of additional data about the trip using a mobile terminal device, and the efficiency of a trip can also be analyzed outside the vehicle. One example of such an application is the concept of an iPhone App under the name MINIMALISM Analyzer that is based on MINI Connected. It provides the customer in a game-like format with feedback about how efficiently he is accelerating and how carefully he is decelerating in advance and how well he is changing gears. The MINIMALISM Analyzer edits the data in a simple and informative way. At the destination it enables the application to analyze the trip, give tips for reducing the fuel consumption and allows the user to compare himself in a Community Ranking.

In addition, the ECO mode has the functions active coasting in neutral and proactive driving assistant that enable an even more efficient driving style.

Proactive Driving Assistant According to the Invention

In the ECO mode the "proactive driving assistant" is also active. It helps the driver to anticipate future driving situations and to make optimal use of the kinetic energy of the vehicle. The vehicle knows the speed limits, tight curves and turn-offs and calculates the exact time at which the driver can let the vehicle coast efficiently. The vehicle knows the appropriate situations due to the data from the navigation system; the pointer appears, for example, in the instrument cluster on the dashboard and/or in the head-up display, thus preferably in the driver's direct line of vision. The proactive driving assistant considers the deceleration behavior, based on current vehicle data and road profile data, and also takes into consideration whether the vehicle has the active coasting in neutral function (see below). The proactive driving assistant allows the vehicle to coast at the right times and, in so doing, save fuel without impeding the vehicles following behind. In addition, future versions of the proactive driving assistant will use current traffic and route data from the so-called "learning navigation system" (see below) in order to optimize its prediction.

Active coasting in neutral is a function that is intended for automatic vehicles and that is especially advantageous in conjunction with the ECO mode. If the driver takes his foot off the gas, the transmission automatically disconnects the drive connection between the motor and the transmission. The only forces now braking the vehicle are the rolling resistance and the air resistance. With an appropriately forward looking driving style the frictional losses in the drive train can be eliminated and, in so doing, save fuel. When the driver gives the brakes a light touch, the vehicle engages again automatically and continues to slow down in overrun mode with the so-called "engine brake." Even if the driver eases off the brake again, the vehicle continues to coast down to lower speeds, and the brake energy regeneration continues to save fuel. If the driver accelerates again and then takes his foot off the gas again, the vehicle coasts again. Needless to say, all driving control and stability systems remain active when the vehicle is in coasting mode. The active coasting mode uses the kinetic energy that already exists in the vehicle.

Although the engine continues to consume fuel in the active coasting mode, the fuel consumption in neutral mode is relatively low. The fuel consumption advantage of the active coasting in neutral mode over the simple engine braking lies in the fact that active coasting avoids frictional losses and—when used with a proactive driving style—can be maintained over longer distances, because the vehicle rolls much further when it is coasting than when slowing down under the engine brake.

In addition to the preset configurations, the scope of the ECO mode can be customized. For example, the ECO mode functions—ECO maximum speed and active coasting in neutral—can be turned on or off individually. Furthermore, the driver has the option of selecting a specific efficiency program that is intended for the interior comfort and that includes a climate program and a special management of the electric consumers. Active coasting in neutral can enhance and/or supplement the proactive driving assistant in an advantageous way.

In addition, it must be pointed out that the ECO mode measures for the drive configuration, the display concept and the proactive assistance including the ECO tips could in principle always be active even without the ECO mode button or could also be automatically activated as a function of certain conditions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
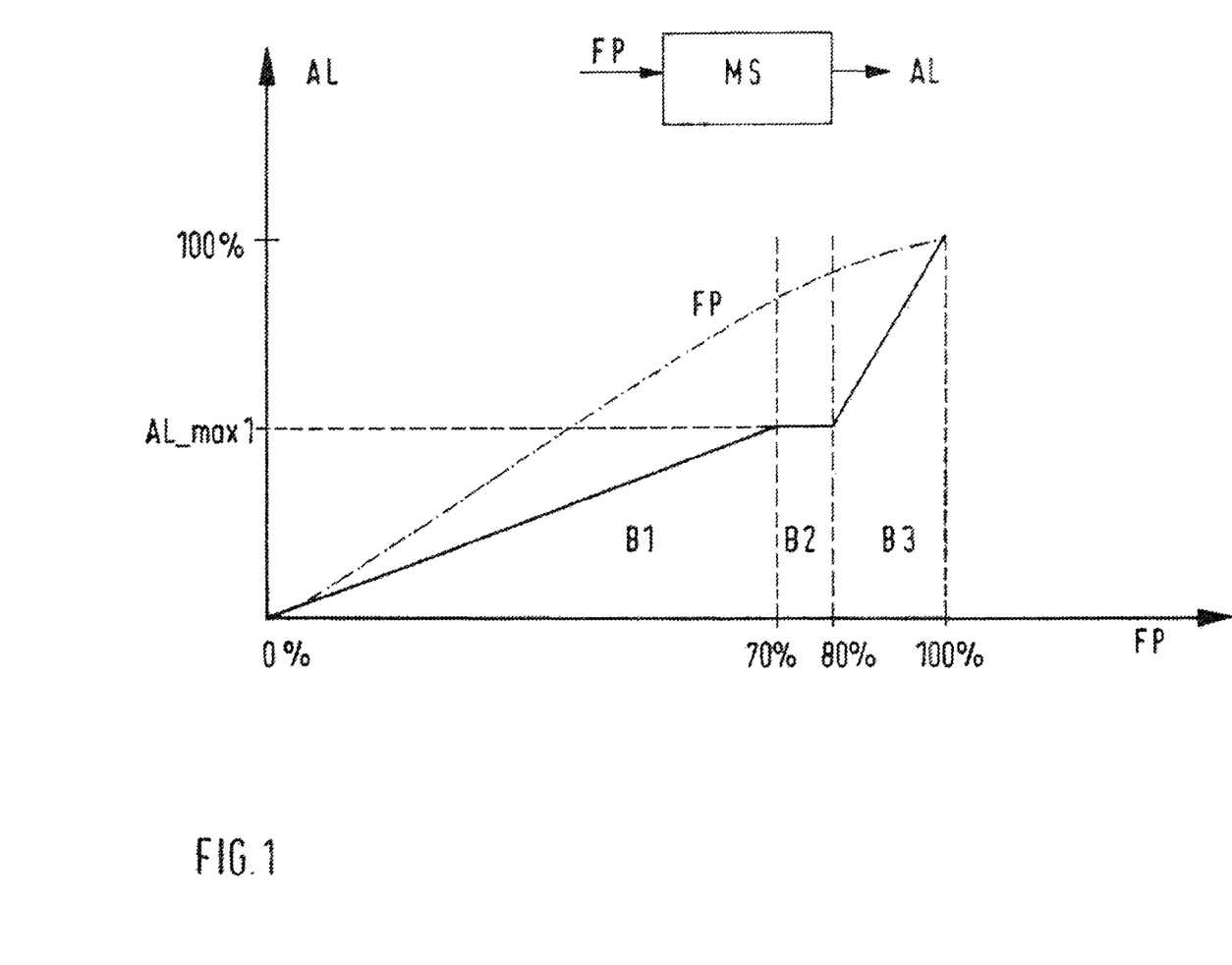
FIG. 1 is a schematic drawing of the accelerator pedal characteristic curve in conjunction with the drive configuration according to an embodiment of the invention.
Figure 2:
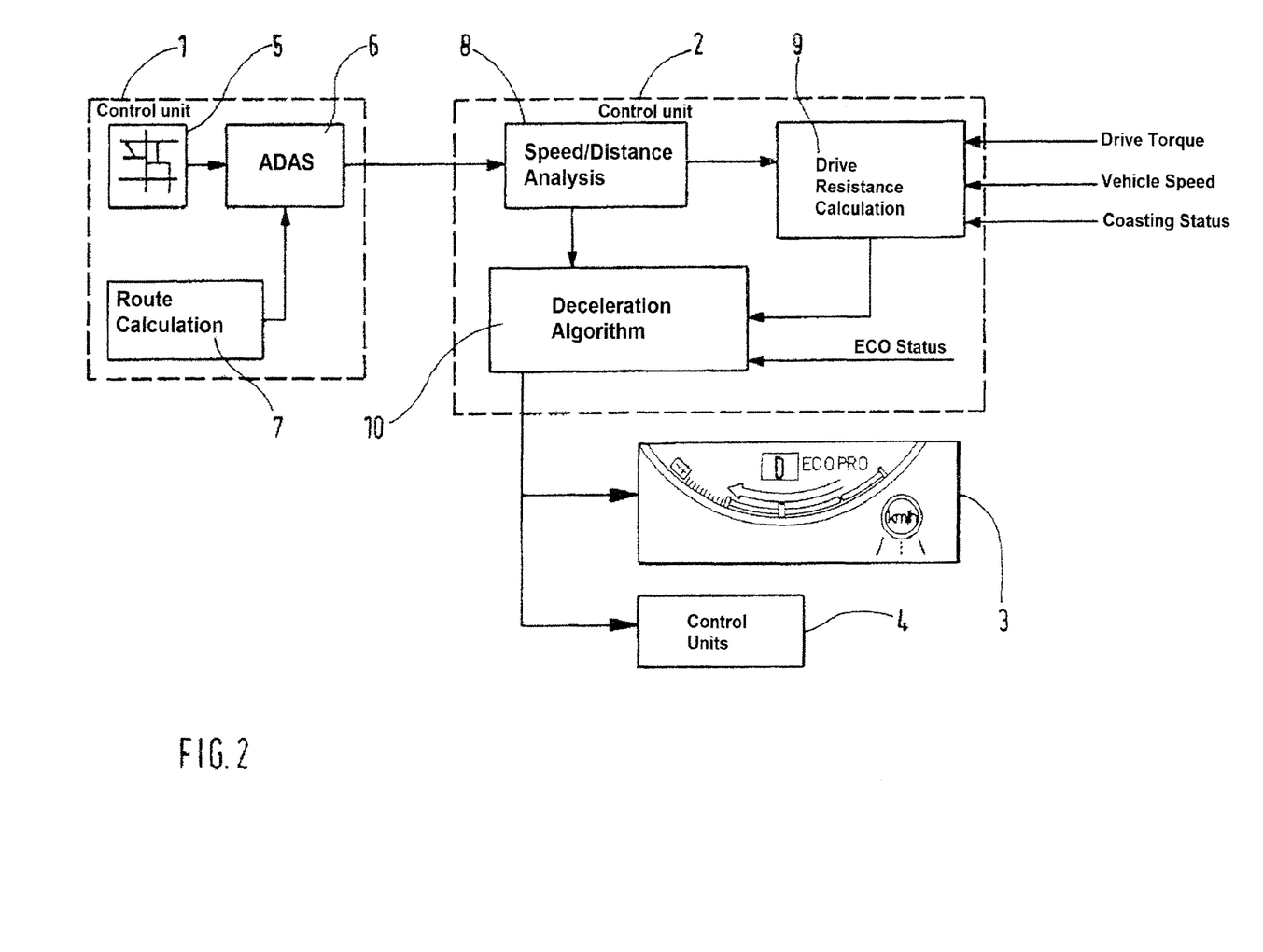
FIG. 2 is a schematic drawing of the function blocks of a program module for executing a proactive assistant according to an embodiment of the invention, especially in the form of a deceleration assistant.

FIG. 1 shows by way of example an internal combustion engine control unit MS that obtains the position of the accelerator pedal (accelerator pedal angle FP) as the input signal and generates a driving power AL as a function of an accelerator pedal characteristic. The control unit MS can be a part of a more complex driver assistance control system (1, 2; FIG. 2) or work together with the same. In FIG. 1 the deflection of the accelerator pedal FP, also called the command from the driver or the accelerator pedal angle, is plotted on the abscissa, and the available driving power AL, which can also be represented as the engine torque or driving force at the wheels or as the acceleration, is plotted on the ordinate.

In principle, it holds that at a constant gear ratio the driving power AL increases with the increasing accelerator pedal angle FP. At a maximum accelerator pedal angle FP=100%, the maximum available driving power AL=100% is requested. The accelerator pedal characteristic is the characteristic that maps the correlation between the accelerator pedal angle FP and the requested driving power AL or more specifically the requested engine torque. In this respect the accelerator pedal characteristic can also be a function of the current engine speed, the chosen gear or the vehicle speed.

In general it holds: the higher the driving force at the wheels, the higher is the necessary power that has to be provided by the drive system. In FIG. 1 an accelerator pedal characteristic from the prior art is shown with the dashed and dotted line. The current fuel consumption of an internal combustion engine increases with the requested driving power. In vehicles with electric drive or in hybrid systems the demand for power from the energy accumulator increases accordingly. Thus, the driver has a direct effect on the fuel consumption of the vehicle by way of the accelerator pedal.

According to the current state of the art, an acceleration pedal does not give any feedback about the driving power that is recommendable for fuel optimized acceleration from a fuel consumption viewpoint. The driver does not receive any support in order to maintain a moderate acceleration level that would enable the customary driving style in everyday traffic with an absolutely reduced fuel consumption. Thus, a fuel optimal acceleration is possible only with the necessary expert knowledge and an extremely sensitive operator control of the accelerator pedal (above all, in the case of vehicles with a very immediate/sportsman-like response behavior). Unskilled drivers sharply increase the fuel consumption by accelerating and braking unnecessarily often and/or by accelerating too fast.

The drive configuration according to the invention introduces an accelerator pedal characteristic for a relaxed and fuel optimized driving style as an aid for a driver lacking the requisite expert knowledge about the consumption characteristic of a motor vehicle. This new accelerator pedal characteristic can be implemented in the vehicle in conformity with the standards or can be called up via a specific vehicle mode (for example, ECO mode). Its purpose is to help the driver reduce the fuel consumption of the vehicle. The invention divides, as shown in FIG. 1, the accelerator pedal characteristic into three ranges B1, B2, and B3. The range B1 enables moderate, fuel optimal driving, whereas the range B3 stands for sportsman-like, dynamic driving with the option of requesting the full driving power. The individual characteristics of this accelerator pedal characteristic are explained in greater detail below.

Starting at an accelerator pedal angle of 0%, a metering range B1 for relaxed driving with negligible fuel consumption is defined. As the progression of the accelerator pedal deflection FP increases, the driving power AL for optimal fuel reduction is increased only moderately in range B1 and enables the driver to avoid any unnecessarily aggressive acceleration and then thereafter braking operations. The resulting relaxed driving style will have a positive effect on the fuel consumption.

If the driver continues to push down on the accelerator pedal FP, the notification range B2 shows very little and preferably no progression and, thus, signals the driver that he is about to leave the range B1 and to enter the range B3. This plateau-like range B2 in the accelerator pedal characteristic makes it easy to find again the maximally available driving power AL_max1 in range B1. This maximum driving power AL_max1 in range B1 is the result of a compromise between the drivability (minimum dynamics in everyday traffic) and the fuel consumption characteristic for the respective motor vehicle.

The departure point is that point that is located at the end of the plateau and represents the right limit of the notification range B2. If this point is exceeded, the driver is in the dynamic range B3. A steep accelerator pedal progression enables a sportsman-like dynamic driving style up to reaching the full load, in order to provide the necessary power ranges, for example, for passing maneuvers or driving up freeway ramps.

The transition from the very flat range B2 into the steep range B3 is conveyed to the driver by the steep rise in the driving power AL feedback concerning the departure from the fuel optimal range B1. The sudden spurt in the driving power can be expressed even more clearly by a simultaneous backshifting. In addition, the driver can be informed about the current accelerator pedal position FP by means of a display (see FIG. 3a), in order to avoid overstepping the departure point.

Due to the inventive accelerator pedal characteristic for implementing a relaxed driving style in motor vehicles, the absolute fuel consumption of motor vehicles can be reduced by an appropriate driving style. This saving of fuel is achieved primarily by selecting lower accelerations. In general, accelerating in a plane results in a higher distance related fuel consumption than constant driving in the plane. Thus, at first glance moderate accelerations result in an additional consumption of fuel due to the longer acceleration distance. However, the absolute fuel consumption during acceleration is lower than is the case with a conventional acceleration, because less engine power has to be requested. Owing to the targeted matching of the accelerator pedal characteristic map and the departure point with the fuel consumption characteristic of the internal combustion engine, the amount of fuel that is saved by a moderate acceleration exceeds the additional fuel consumption. The result is a decrease in the absolute fuel consumption over the entire distance and enables a significant fuel consumption advantage in everyday traffic over the conventional accelerator pedal designs.

FIG. 2 shows possible components of a proactive driving assistant as the program modules. The program modules can be integrated into an electronic control unit or into several control units, such as in the already existing navigation system, an internal combustion engine control unit, an automatic cruise controller (ACC) and/or an additional longitudinal dynamics control unit. All of the program modules form altogether one control system for the driver assistance system according to the invention.

FIG. 2 shows advantageous function blocks as the program modules in a control system in order to facilitate even more the proactive driving, in particular to give instructions for proactive braking in advance with the goal of minimizing the fuel consumption (deceleration assistant). In the embodiment from FIG. 2 the control system is integrated, for example, into two control units 1 and 2.

One control unit 1 may be, for example, an expanded electronic navigation unit (navigation system) that typically includes, in particular, the map data 5, a route calculating block 7 and a so-called ADAS module 6 for obtaining route data. ADAS (advance driver assistance system) is an already existing navigation software for route optimization from the company TeleAtlas for obtaining route data to support proactive driving. Route data items are, for example, differences in altitude, route profiles (straight or curvilinear roads) or other landscape geometry. Furthermore, traffic signs can be evaluated from the map data 5.

The route data, such as the differences in altitude, route profiles, tight curves, turn-offs and certain traffic signs for speed limits or places, are transmitted from the navigation unit 1 to a longitudinal dynamics control unit 2, which receives the vehicle data, such as the drive torque, the vehicle speed or the coasting status, as additional input signals. These input signals are processed in the function block 8 for evaluating speeds and distances. The results of the evaluation in the function block 8 are fed to a deceleration algorithm 10. Furthermore, the function block 8 transmits the slope from the route data as the input signal of a driving resistance calculating block 9. Block 9 calculates the currently possible deceleration as a function of the vehicle data and the slope. The resulting deceleration profile is also fed from block 9 to the deceleration algorithm 10.

If there is an ECO mode switch (as stated above in general terms), the deceleration algorithm 10 can also receive the status of this switch (open arrow to block 10) as information. The deceleration algorithm 10 calculates, for example, the exact time or route point, at which the vehicle can be rolled down in overrun mode to a reduced target speed in the future (braking situation). If a braking situation is active, then preferably, on the one hand, a braking display 3 instructing the driver to execute a certain action is transmitted, and, on the other hand, control units—combined herein as block 4—are actuated accordingly for the purpose of controlling certain efficient operational strategies (for example, recuperation). Advantageous details and operating principles of the braking display 3 are explained in greater detail below in FIGS. 3a to 3d in conjunction with additional displays 30.

Figure 3A:
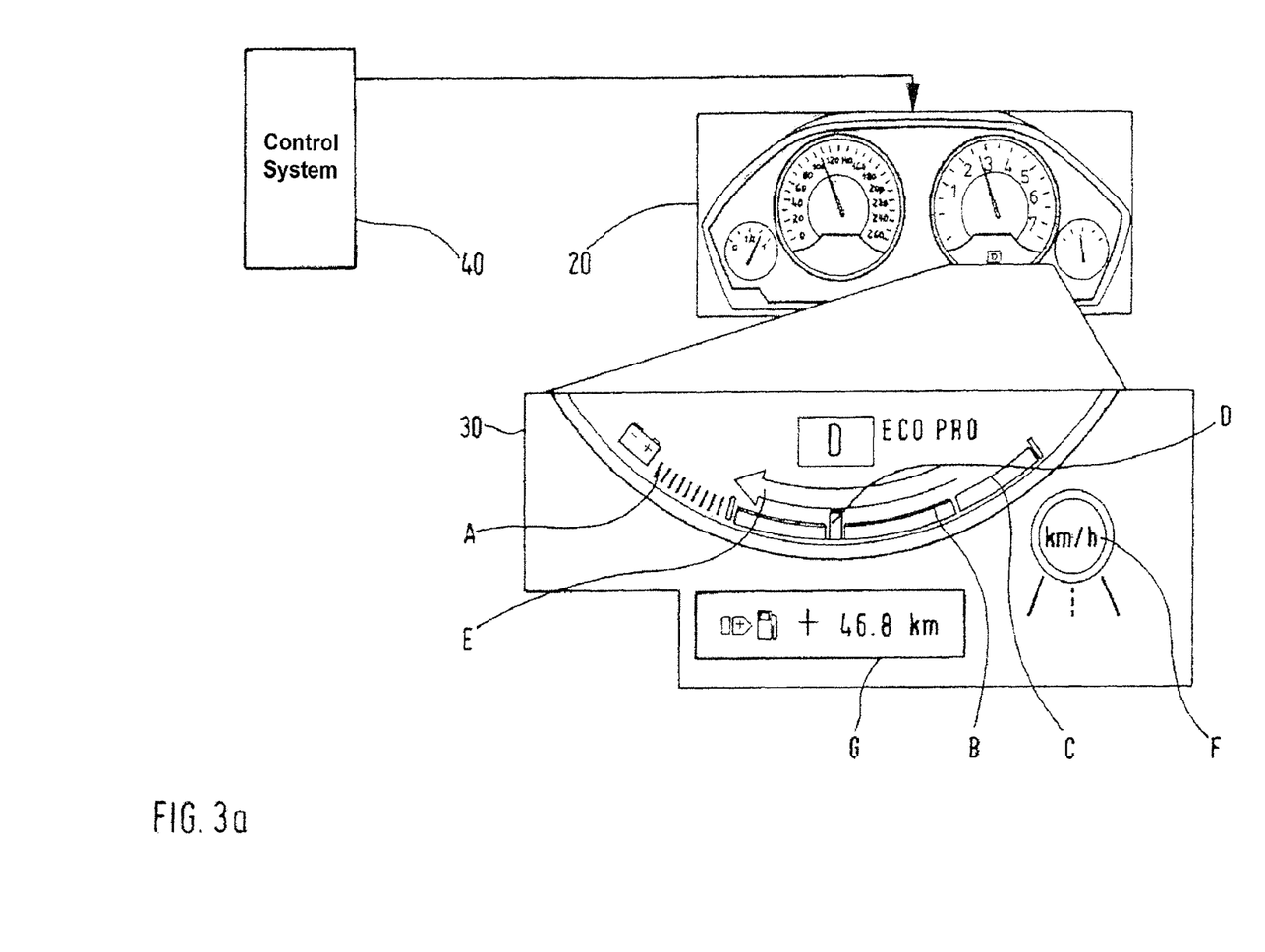
FIG. 3a to FIG. 3d are examples of the inventive display concept in conjunction with possible ECO tips, in particular specific ECO tips for the drive configuration and for the proactive driving assistant.

FIG. 3a is a schematic drawing of a control system 40 for implementing a driver assistance function, such as the deceleration assistant depicted in FIG. 2. The control system 40 may be, for example, the combination of the program modules 1 and 2 in the exemplary embodiment from FIG. 2. The control system 40 may consist of multiple control units, for example a navigation control system, an internal combustion engine control unit, an automatic transmission control unit, a brake control unit and/or a driving speed control unit (for example, ACC). The program modules that are required for the invention may be integrated into a variety of different control units. The control units interact, for example, via bus systems and actuate in the customary manner the necessary actuators that are connected to said bus systems.

If the control system 40 is supposed to send a display 30 to give instructions to the driver, then certain control information is transmitted to a display unit 20—in this case preferably to an instrument cluster.

In the display unit 20 an ECO display 30 is implemented according to the display concept of the driver assistance system according to the invention. The display concept provides the ECO display 30 in the (activated) ECO mode, preferably in place of the conventional fuel consumption display.

The ECO display 30 is preferably a bar displaying a range B that is highlighted (for example, brighter illumination or illumination in a specific color (green or blue) or constant illumination), if the driving style or the accelerator pedal angle FP is in an efficiency range suggested by the control system 40. The marker D also shows the driver, preferably in addition, how well he is following the suggested range B by the adjustment of the accelerator pedal angle FP.

When applied to the exemplary embodiment from FIG. 1, the marker D in the display range B would appear, according to the accelerator pedal position FP, in the accelerator pedal range B1. In the accelerator pedal range B1, the display range B would be highlighted.

If the driving style or the accelerator pedal angle is or becomes inefficient, the visual highlighting of range B is reset (for example, a darker light or an intensive rich gray colored illumination or blinking light). In a preferred embodiment the highlighting would be, for example, light blue in this case—not light gray (which, however, cannot be shown due to the black/white drawing).

A recommendation for reducing the accelerator pedal angle or for making any other change in the driving style is conveyed preferably by the appearance of an illuminated arrow E in the efficient direction.

Preferably, in the ECO display 30, the efficiency range B is followed by a dynamic range C, which, however, is not highlighted, if the accelerator pedal angle is in this range C, in which, for example, only the marker D is placed.

When applied to the exemplary embodiment from FIG. 1, the marker D in the display range C would appear, according to the accelerator pedal position, in the accelerator pedal range B3. In the accelerator pedal range B3 the display range B would not be highlighted. If the accelerator pedal angle were 0%, thus, in overrun mode, then preferably in addition to the display range B, a display range A could also be highlighted in order to indicate an energy recovery, for example, by means of recuperation.

In addition to the bar display, the ECO display 30 can send ECO tips in the form of symbols F and/or in the form of short text instructions or text information G.

When applied to the exemplary embodiment from FIG. 2, the deceleration assistant can display an image shown as a symbol F in FIG. 2 and FIG. 3a. This image conveys the need to reduce the speed in the near future. Even though any expected traffic sign (speed limit, place name signs, entrance ramp . . . ) could be displayed, in this case, however, a symbol F is used that consolidates the functions—in this case a road with an arbitrary km/h limit—in order to make it easier for the driver to recognize again the situation and not to be diverted by too many different symbols. An additional advantageous design of the inventive display concept, in this case particularly the ECO display 30, has a "success display"—herein as text information G—that shows the driver the increased range that he has gained or the amount of fuel that he has saved with his efficient driving.

Figure 3B:
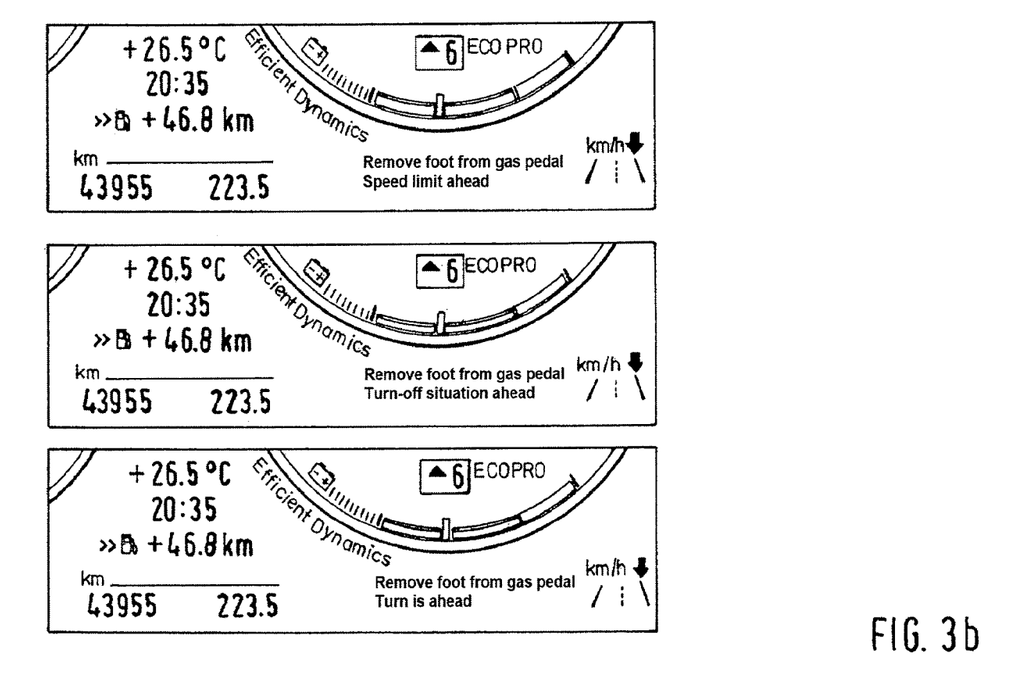

FIG. 3b shows three possible different text instructions G as additional examples in conjunction with the braking assistant. In FIG. 3b the examples are configured so that, in particular, range B will not be highlighted until the recommended driving style is executed. In this case, for example, the highlighting would have been in light blue—not light gray—(but, again, cannot be depicted here due to the black/white drawing).

Figure 3C:
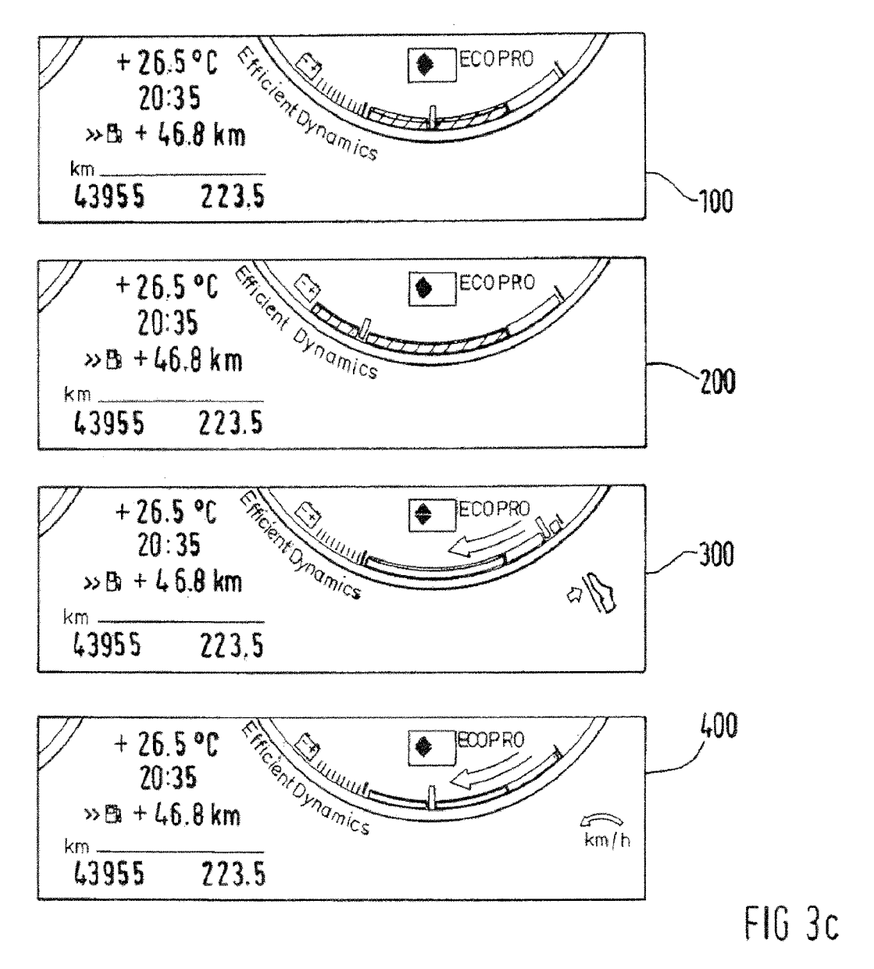
Figure 3D:
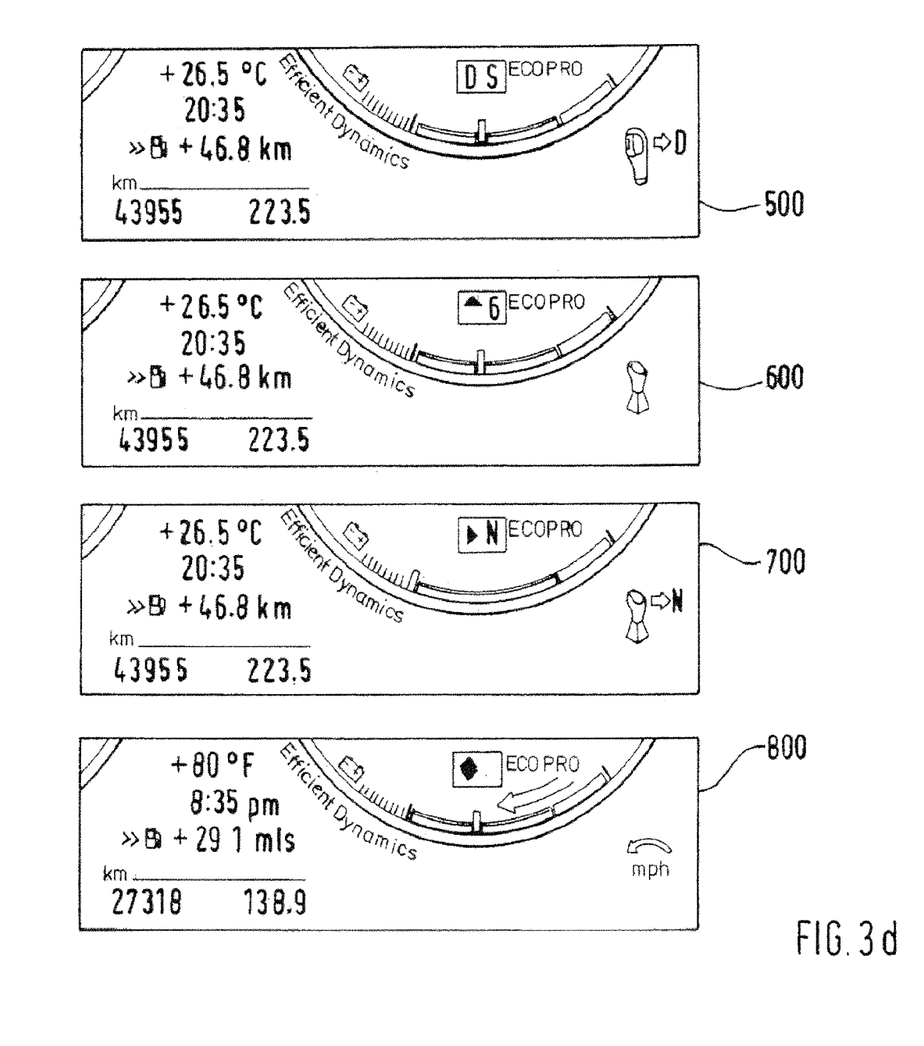

FIGS. 3c and 3d show additional examples of the display concept according to the invention, where shaded areas equal highlighted areas, and non-shaded areas equal unhighlighted areas. Therefore, highlighted is only the display range B in the display examples 100 and 200 and the display range A in the display example 200.

In the display example 100 in FIG. 3c, the driver is following the instructions, such as the efficient accelerator pedal characteristic according to FIG. 1: marker D in display range B (highlighted) corresponding to accelerator pedal position FP in range B1.

In the display example 200 in FIG. 3c, the vehicle is in the recuperation mode (overrun mode), that is, optimal efficiency.

In the display example 300 in FIG. 3c, the range B is, first of all, not highlighted; secondly, the arrow E appears; third, the accelerator pedal appears as the symbol F; and fourth, the marker D is in the dynamic range C. Therefore, according to the exemplary embodiment in FIG. 1, the accelerator pedal position FP is in range B3. The driver is shown an ECO tip "take the foot off the gas" based on the accelerator pedal position inefficient driving style due to the demand for too high a load.

In the display example 400 in FIG. 3c, the arrow E and the corresponding symbol F convey to the driver that he has exceeded a self-set economical maximum speed threshold—an ECO tip for reducing the speed.

In the display example 500 in FIG. 3d, the ECO tip for switching the automatic transmission from sports program S to economical (=efficient) normal driving program D is conveyed by the symbol F.

In the display example 600 in FIG. 3d, the ECO tip for changing into 6th gear is conveyed by the symbol F and the familiar shift point display.

In the display example 700 in FIG. 3d, the ECO tip for changing into neutral gear N is conveyed by the symbol F and the familiar shift point display.

In the display example 800 in FIG. 3d, the ECO tip for reducing the speed is conveyed by the symbol F.

In particular, the combination of the display examples 100 to 300 of the display concept is advantageous for the drive configuration according to the invention. In particular, the combination of the display examples in FIG. 3b of the display concept is advantageous for the deceleration assistant and/or the proactive driving assistant. The display examples can also be combined, as shown in FIG. 3a.

In principle, the drive configuration, the display concept and the proactive assistant, as well as the ECO tips, represent inventions that can be implemented independently of each other. However, in the present case they are combined together in an especially advantageous way to form a holistic approach for increasing the efficiency or, more specifically, reducing the fuel consumption.

The aforementioned measures can be broadened to form a proactive energy management that is even more complex and that teaches the vehicle to think with and ahead of its driver. The following are some examples.

Information that is already on hand in the vehicle and comes from, for example, the navigation unit is used to predict the next situation, in which the vehicle will find itself. Typical events are, for example, traffic jams, slopes, speed limits or low traffic zones. The operating strategy can focus on these boundary conditions and react optimally. As an alternative, the information from the proactive driving function can be used to optimize an additional key factor of the fuel consumption: the driving style. Therefore, the aim is to improve and develop the driver assistance system in such a way that it can help the driver use the information in a preventive way, for example, for a future braking situation at a speed limit. If, for example, the driver will soon be changing from the rural road to the freeway, the coolant temperature is then reduced by the anticipatory heat management in order to provide more engine power output. In the event of urban trips, however, the temperature is raised, because there is no expectation of high loads that require special cooling. The result: less internal engine friction and higher efficiency. If, for example, a hybrid vehicle approaches a longer downhill section, a commensurate message is sent to the on-board computer. This computer orders that the generator be uncoupled beforehand and that the charging of the battery be shifted to overrun mode when driving downhill. If a limited or low traffic zone is detected, then the battery is prepared beforehand for maximum electric driving.

The present generation of navigation systems is extremely popular among drivers as a reliable means of guidance to the destination. However, these navigation systems do this only if they are told where they are supposed to go. Using artificial intelligence, the future so-called learning navigation systems will also be able to foresee the destination of the trip without the driver having to enter it beforehand, to give warnings of traffic jams and to reduce fuel consumption.

For this prediction it is necessary for the learning navigation system to learn (become acquainted with) the driver and the route. For each driver the system builds a protected portfolio that stores the information about the driver's trips. Destinations, short-cuts and secret paths as well as the time of day and, for example, the seating assignment can serve as information. With all of this information the trip is much more comfortable. Warnings about traffic jams in sufficient time, the rapid selection of the most probable—not the last or stored—destination, and the synchronization with a personal calendar in a smartphone are only the first of many possible features.

Networking of the self-learning navigation system with the systems inside the vehicle opens up particularly useful possibilities, for example, anticipatory energy management measures (see above).

The many data items absorbed by the learning navigation system are not only useful to the individual driver but also practical for all navigation users. They include, for example, information about the route characteristic, thus, slopes, curve radii and speed limits. These data items are compared with the digital map database and help to improve systematically the map database. However, information about the traffic flow or the fuel consumption can also be learned and shared with other vehicles.

With this learned knowledge the navigation system can suggest to the driver, for example, an especially fast or an especially low usage route. The intelligent prediction also benefits from the learned information of all vehicles. The prediction about the route ahead of the driver becomes more accurate; potential errors in the map data are corrected, and the prediction concerning the traffic situation ahead of the vehicle is improved. In this way the anticipatory energy management system in the vehicle can work even more accurately and efficiently.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system for assisting a driver in optimizing energy consumption, the driver assistance system comprising:
    an electronic control system that assesses a current energy consumption efficiency of a vehicle; and
    a display unit that is configured to display the current energy consumption efficiency of the vehicle, wherein a plurality of individually-bound energy consumption efficiency ranges are displayed on the display unit, and the current energy consumption efficiency of the vehicle is displayed with a dynamic marker that moves within one of the individually-bound energy consumption efficiency ranges in response to operational changes in the vehicle that impact the current energy consumption efficiency of the vehicle, wherein the plurality of individually bound energy consumption efficiency ranges includes at least an optimized range, a notification range, and a dynamic range.

2. The driver assistance system of claim 1, wherein the operational changes correspond directly to angles of an accelerator pedal of the vehicle and to a requested engine torque.

3. The driver assistance system of claim 1, wherein the current energy consumption efficiency is displayed as a visually highlighted portion of the plurality of individually-bound energy consumption efficiency ranges.

4. The driver assistance system of claim 1, wherein the operational changes in the vehicle correspond to changes in a current angle of an accelerator pedal of the vehicle.

5. The driver assistance system of claim 1, wherein the operational changes in the vehicle are based on at least one of an acceleration and deceleration of the vehicle.

6. The driver assistance system of claim 1, wherein the display unit is further configured to display instructions to operate the vehicle such that the current energy consumption efficiency moves to a more efficient range within the plurality of individually-bound energy consumption efficiency ranges, and wherein the instructions are displayed relative to the plurality of individually-bound energy consumption efficiency ranges and a current position of the dynamic marker.

7. The driver assistance system of claim 6, wherein the instructions are displayed as at least an indicator in the direction of the more efficient range or symbols and images representing recommended energy optimization actions.

8. The driver assistance system of claim 1, wherein the display unit displays a recommendation when the dynamic marker indicates a transition from one of the efficiency ranges to another one.

9. The driver assistance system of claim 1, wherein the size of each of the efficiency ranges dynamically adjusts in relation to the current energy consumption efficiency of the vehicle.

10. A method for assisting a driver in optimizing energy consumption, the method comprising:
    displaying a current energy consumption efficiency of a vehicle on a display unit, wherein the current energy consumption efficiency of the vehicle is displayed with a dynamic marker that moves within individually-bound energy consumption efficiency ranges, and wherein the dynamic marker's movement is in response to operational changes in the vehicle that impact the current energy consumption efficiency of the vehicle, wherein the individually bound energy consumption efficiency ranges include at least an optimized range, a notification range, and wherein the operational changes in the vehicle are based on at least one of an acceleration and deceleration of the vehicle.

11. The method of claim 10, further comprising displaying a recommendation, on the display unit, when the dynamic marker indicates a transition from one of the individually-bound energy consumption efficiency ranges to another one of the individually-bound energy consumption efficiencies ranges.

12. The method of claim 10, wherein a size of each of the individually-bound energy consumption efficiency ranges dynamically adjusts in relation to an energy consumption of the vehicle.

* * * * *